(12) United States Patent
Brach et al.

(10) Patent No.: US 11,804,756 B2
(45) Date of Patent: Oct. 31, 2023

(54) ACTIVE PART OF AN ELECTRIC MACHINE, HAVING A PRINTED CONDUCTOR

(71) Applicant: Siemens Aktiengesellschaft, Munich (DE)

(72) Inventors: Karsten Brach, Berlin (DE); Jens Dahl Jensen, Berlin (DE); Hartmut Rauch, Berlin (DE); Jakob Schneck, Berlin (DE); Oliver Stier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/023,627

(22) PCT Filed: Aug. 25, 2021

(86) PCT No.: PCT/EP2021/073442
§ 371 (c)(1),
(2) Date: Feb. 27, 2023

(87) PCT Pub. No.: WO2022/043353
PCT Pub. Date: Mar. 3, 2022

(65) Prior Publication Data
US 2023/0246527 A1 Aug. 3, 2023

(30) Foreign Application Priority Data

Aug. 31, 2020 (EP) ..................... 20193655

(51) Int. Cl.
*H02K 15/00* (2006.01)
*H02K 3/26* (2006.01)
(Continued)

(52) U.S. Cl.
CPC ......... *H02K 15/0012* (2013.01); *B22F 10/64* (2021.01); *B33Y 40/20* (2020.01);
(Continued)

(58) Field of Classification Search
CPC .... H02K 3/26; H02K 15/002; H02K 15/0407; H02K 17/166; H02K 17/168; B22F 10/64; B22F 2998/10; B33Y 40/20; B33Y 80/00
(Continued)

(56) References Cited

U.S. PATENT DOCUMENTS

| | | | | |
|---|---|---|---|---|
| 3,456,144 A | * | 7/1969 | Jacques | .................... H02K 3/26 310/268 |
| 3,944,857 A | * | 3/1976 | Faulhaber | ................ H02K 3/26 310/266 |

(Continued)

FOREIGN PATENT DOCUMENTS

DE 102012006248 A1 10/2012
EP 3629452 A1 4/2020
(Continued)

*Primary Examiner* — Rashad H Johnson
(74) *Attorney, Agent, or Firm* — Henry M. Feiereisen LLC

(57) ABSTRACT

An active part of an electric machine includes electrical conductors which are additively printed in layers, and intermediate bodies respectively disposed between the electrical conductors and being additively printed in layers, wherein the electrical conductors are printed in a radially increasing manner, alternating with the intermediate bodies. A contact layer <=300 μm of a third material is applied between at least one of the electrical conductors and at least one of the printed intermediate bodies, with a diffusion zone being embodied by the contact layer and a heat treatment.

20 Claims, 4 Drawing Sheets

(51) Int. Cl.
- *H02K 17/16* (2006.01)
- *B33Y 80/00* (2015.01)
- *B33Y 40/20* (2020.01)
- *B22F 10/64* (2021.01)
- *H02K 15/04* (2006.01)

(52) U.S. Cl.
CPC ............... *B33Y 80/00* (2014.12); *H02K 3/26* (2013.01); *H02K 15/0407* (2013.01); *H02K 17/166* (2023.05); *H02K 17/168* (2023.05); *B22F 2998/10* (2013.01)

(58) Field of Classification Search
USPC ........................................................ 310/211
See application file for complete search history.

(56) References Cited

U.S. PATENT DOCUMENTS

| | | | | |
|---|---|---|---|---|
| 2006/0202584 | A1* | 9/2006 | Jore | ..................... H02K 11/215 |
| | | | | 310/179 |
| 2016/0163445 | A1* | 6/2016 | Bertels | ................... H04R 9/022 |
| | | | | 310/156.01 |
| 2017/0098982 | A1* | 4/2017 | Shaw | ..................... H02K 9/223 |
| 2017/0194826 | A1* | 7/2017 | Krivda | ..................... H02K 3/40 |
| 2019/0052140 | A1* | 2/2019 | Shaw | ..................... H02K 21/24 |
| 2019/0229594 | A1 | 7/2019 | Kuemmlee | |
| 2019/0305616 | A1 | 10/2019 | Bittner et al. | |
| 2020/0119628 | A1* | 4/2020 | Khan | ........................ H02K 1/18 |
| 2021/0143697 | A1* | 5/2021 | Lee | .......................... H01F 27/22 |
| 2021/0367494 | A1* | 11/2021 | Takahashi | ............ H02K 1/2788 |
| 2022/0045581 | A1* | 2/2022 | Kümmlee | ........... H02K 15/0012 |
| 2022/0094227 | A1* | 3/2022 | Brach | ....................... H02K 3/38 |
| 2022/0149019 | A1* | 5/2022 | Brandl | ...................... B60Q 1/54 |
| 2022/0255383 | A1* | 8/2022 | Koch | ....................... H02K 3/02 |
| 2022/0336140 | A1* | 10/2022 | Sakurai | ............... H01F 1/14766 |
| 2023/0041608 | A1* | 2/2023 | Koch | ....................... H02K 1/12 |
| 2023/0156912 | A1* | 5/2023 | Yao | .......................... H05K 3/42 |
| | | | | 174/262 |

FOREIGN PATENT DOCUMENTS

| | | |
|---|---|---|
| JP | 2014108006 A | 6/2014 |
| RU | 2698321 C1 | 8/2019 |
| RU | 2707883 C1 | 12/2019 |

\* cited by examiner

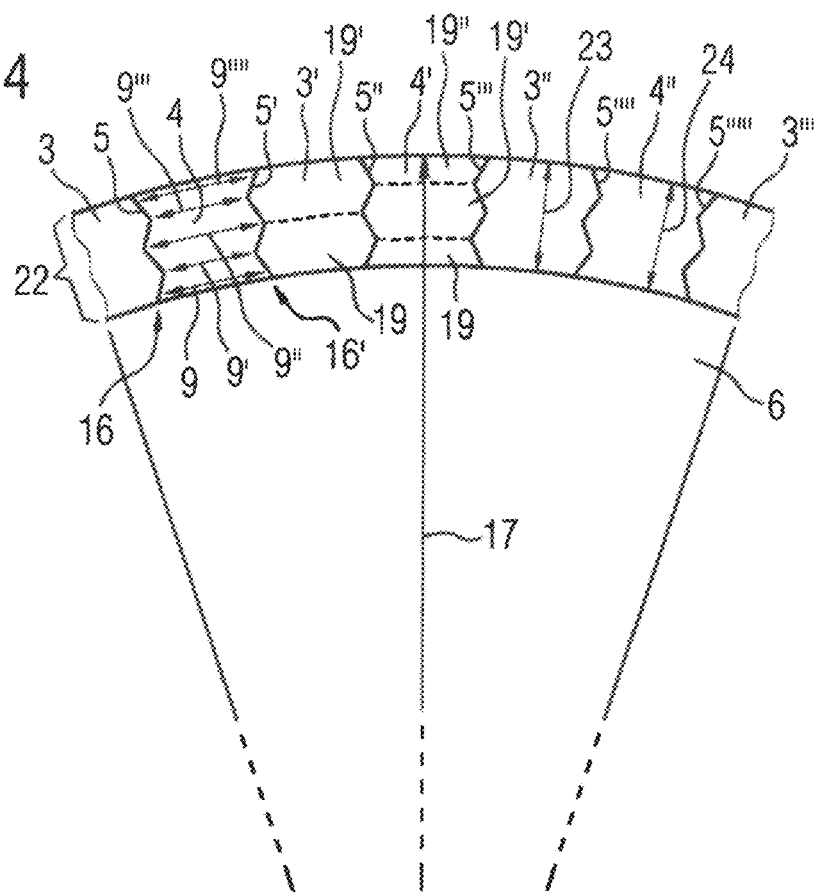
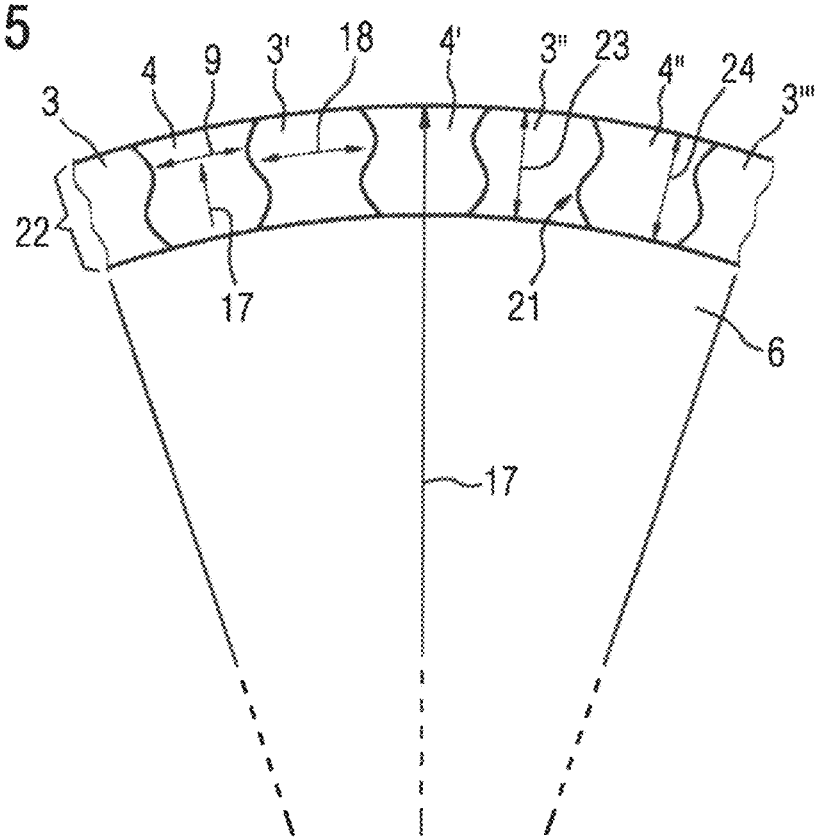

ACTIVE PART OF AN ELECTRIC MACHINE, HAVING A PRINTED CONDUCTOR

CROSS-REFERENCES TO RELATED APPLICATIONS

This application is the U.S. National Stage of International Application No. PCT/EP2021/073442, filed Aug. 25, 2021, which designated the United States and has been published as International Publication No. WO 2022/043353 A1 and which claims the priority of European Patent Application, Serial No. 20193655.6, filed Aug. 31, 2020, pursuant to 35 U.S.C. 119(a)-(d),

BACKGROUND OF THE INVENTION

The invention relates to an active part of an electric machine and a method for the production thereof.

An electric machine has a stator and a rotor. If the electric machine is an asynchronous machine, then both the stator and the rotor are energized during operation of the electric machine. Thus, the rotor is also an active part of the electric machine, as it has a squirrel cage, which has conductors, through which electrical current flows during operation of the electric machine.

The rotor of the electric machine, i.e. the active part of the asynchronous machine that rotates during operation, is exposed to centrifugal forces during operation. Conductors of the active part, i.e. in particular conductors of the squirrel cage, are to be embodied or constructed such that they withstand the centrifugal forces. A specific problem, for example, consists in embodying a connection (for example for producing components for electric machines, such as the rotor of an asynchronous machine as the active part thereof, for example) in a stable manner with the use of different materials (for example copper/iron or copper/steel or iron/steel). This is achieved, for example, by way of material-fit connections. To date, a material-fit connection of this kind has been manufactured for cage rotors of asynchronous machines. These rotors require short-circuited rotor windings, in order to fulfill their function. The energized stator induces currents in the rotor, which cause a torque with the field of the stator and thus drive a load. In high rotational speed drives, for reasons of mechanical strength, the rotor is made of solid, high-strength steel with an integrated short-circuit rotor winding. To integrate the rotor winding, first slots are milled or turned in the solid rotor balls for the bars or the ring segments of the winding, and solid, nickel-plated copper bars/ring segments are subsequently inserted there. Through the subsequent application of a Hot Isostatic Pressing method (HIP), a diffusion zone occurs between the copper of the bars and the nickel of the coating, as well as between the nickel of the coating and the steel of the solid rotor. This high-strength connection is necessary in order to withstand the centrifugal force stresses at the highest rotational speeds. The HIP process requires high temperatures and pressures. The method described is very elaborate and expensive.

One object of the invention is to embody an active part of the electric machine, in particular a rotor of the electric machine, in a simple and stable manner. This should achieve that the active part is not destroyed during rotation.

SUMMARY OF THE INVENTION

One achievement of the object is produced in an active part as set forth hereinafter. A further achievement of the object is produced in a method as set forth hereinafter. Further embodiments are produced in accordance with dependent claims.

An active part of an electric machine, which has electrical conductors, has electrical conductors that are printed. In particular, the printed electrical conductors are additively printed. This means that an additive printing method is, has been or was used to print the electrical conductor. In particular, the active part of the electric machine is a rotor of the electric machine. In particular, the electric machine is an asynchronous machine. In particular, the printed electrical conductor is a conductor of a squirrel cage of the asynchronous machine, wherein here a printing, i.e. something that has been printed, is also to be understood in particular as meaning an additive printing in the following. In particular, the printing is therefore a 3D printing, such as selective laser melting (SLM), selective laser sintering (SLS), electron beam melting (EBM), laser metal deposition (LMD), cold gas spraying, etc., for example. An intermediate body is located between the printed electrical conductors. The intermediate bodies have an electrical conductivity that is different from and lower than that of the electrical conductors. In particular, the intermediate body is therefore an isolator. In particular, the intermediate body isolates two adjacent electrical conductors from one another when the intermediate body is positioned between the adjacent electrical conductors. In particular, the intermediate body consists of an isolating material or at least also has said isolating material. By printing the electrical conductors, it is possible to produce a strong connection. The printed electrical conductors have a longitudinal orientation in parallel with the axis of rotation of the rotor. In particular, the electric machine is therefore a rotary electric machine, which has an axis of rotation. A radial reference region is produced from a distance from the axis of rotation for the rotor or the stator of the electric machine. Regions or points of the rotor or stator of the electric machine therefore have a radial reference or can be described in relation to their radial position or orientation. The electric machine can also be a linear motor, for example. It is possible to use copper and/or aluminum for the printed electrical conductor, for example.

In particular, the electrical conductors are printed in layers, i.e. layer by layer (additively printed). In particular, the layers extend along the axis of rotation of the electric machine, have a curve section and have a radial height, wherein the radius in each case relates to a distance from the axis of rotation. In particular, the intermediate bodies are also printed in layers, i.e. layer by layer (additively printed). In particular, these layers also extend along the axis of rotation of the electric machine, have a curve section and have a radial height, wherein the radius in each case relates to a distance from the axis of rotation.

In one embodiment of the active part, the additive printing of different materials in contact with one another takes place in a time-offset manner. This facilitates a layer structure.

In one embodiment of the active part, electrical conductors are therefore printed, as are intermediate bodies between the electrical conductors. This also increases the strength. In particular, the laminated core can also be printed in full or in part.

In one embodiment of the active part, the electrical conductors are positioned symmetrically over the circumference of the rotor (active part).

In one embodiment of the active part, at least one of the electrical conductors in one section has a cross-section which tapers as the radius increases. In this context, the radius relates to the axis of rotation of the active part (rotor).

The electrical conductors have a volume, as do the intermediate bodies. In particular, the volume is produced from a length, along or in parallel with the axis of rotation, a width, produced from the size of the circular section occupied, and a height, produced from a radial extension. In one embodiment of the active part, at least one of the electrical conductors in one section therefore has a cross-section which tapers as the height increases. In this context, the height increases as the radial distance increases.

If the cross-section tapers radially outward, then the printed electrical conductor can be held by adjacent intermediate bodies. This is produced from the geometric shape, if the intermediate bodies in the circumferential direction in each case connect to the electrical conductors in an indirect or direct manner. An indirect connection is produced, for example, when another intermediate layer is located between the electrical conductor and the intermediate body. For example, this is made of a material that has media. The intermediate bodies are made of a material, for example, that features steel and/or iron. If the cross-section of a printed electrical conductor tapers, then in particular it tapers in a tangential direction. The cross-section is produced from an end face-side view of the electrical conductors or the intermediate bodies.

In one embodiment of the active part, the tangential extension of the cross-section alternately increases and decreases, or decreases and increases, radially outward. This likewise affects the cross-section in relation to the tangential extension of the intermediate bodies. In this context, in one embodiment it arises that, where the cross-section of the printed electrical conductor tapers in a radial direction, the cross-section of the intermediate body increases accordingly, and vice versa. In particular, this produces an interleaving of electrical conductors and intermediate bodies, wherein the intermediate bodies can also be designed as printed.

In one embodiment of the active part, it is consequently therefore possible for a design such that at least one of the electrical conductors has a large number of sections with cross-sections that taper as the radius increases. In particular, it is therefore possible for an active part to be embodied in such a manner that at least one of the electrical conductors has a large number of sections with cross-sections that taper as the height increases.

In this context, for example, the sections at least partially correspond to sections of a printing of the electrical conductors, wherein the electrical conductors are printed in a radially increasing manner, alternating with the intermediate bodies.

In one embodiment of the active part, a three-dimensional structure is embodied between at least one of the printed electrical conductors and the printed intermediate body. In particular, it is therefore possible for an active part to be embodied in such a manner that a three-dimensional structure is embodied between at least one of the printed electrical conductors and at least one of the printed intermediate bodies.

This three-dimensional structure has a jagged or undulating cross-section, for example. Thus, a positive fit is produced between the intermediate bodies and the electrical conductors, meaning that they can be better held in position, even if forces act upon them radially outward.

In one embodiment of the active part, the three-dimensional structure therefore has a jagged pattern or an undulating pattern in a cross-section.

In one embodiment of the active part, the electrical conductivity of the electrical conductors differs radially. In particular, it is therefore possible for an active part to be embodied in such a manner that the electrical conductivity of the electrical conductors differs as a function of the height. The height is produced from the radial extension. In particular, the electrical conductivity is greater in regions that have a larger radius, i.e. a greater distance from the axis of rotation. Thus, the resistance of the electrical conductors can be set and the skin effect can also be taken into consideration. For example, the electrical conductivity can also decrease radially outward.

In one embodiment of the active part, a contact layer, which in particular features nickel, is between at least one of the electrical conductors and at least one of the printed intermediate bodies. For example, the contact layer is printed or sprayed on. By way of the contact layer, it is possible in particular to promote diffusion in relation to the electrical conductor and/or in relation to the intermediate body. Thus, it is possible to improve the connection between electrical conductor and intermediate body. In particular, this is advantageous in the event of high centrifugal forces occurring.

In one embodiment of the active part, the electrical conductors and/or the, in particular printed, intermediate bodies between two of the electrical conductors, have layers that radially end or begin there, at which the thickness of one of the electrical conductors or intermediate bodies has a local minimum or maximum. The layer structure is produced from the electrical conductors or the intermediate bodies being printed layer by layer, radially outward. The radial thickness of the electrical conductors and the intermediate bodies therefore increases in an alternating (alternate) manner. This makes it possible to produce the undulating shape or the jagged shape, which gives additional stabilization.

In a method for producing an active part, in particular a rotor with a squirrel cage, an electric machine, the electrical conductors are printed, wherein an intermediate body is printed between electrical conductors, wherein there is an alternating change between the printing of at least one electrical conductor and an intermediate body. This produces a layer-by-layer structure of electrical conductors or intermediate bodies. In particular, the electrical conductors are therefore printed layer by layer. In particular, the intermediate bodies are also printed layer by layer. In particular, the layers of electrical conductors and intermediate bodies are printed in an alternating manner. In particular, the printing involves an additive printing. Additive printing is often also referred to as 3D printing. In particular, the squirrel cage of the active part (rotor) of the asynchronous machine is to be additively manufactured such that a material-fit connection between the materials is produced. The material-fit connection is necessary in order to be able to ensure high strengths in the interface of the connection, and thus between the substances. This is achieved, for example, by means of a cold gas spraying method. By means of the cold gas spraying method, it is possible to print electrically conductive material such as copper or aluminum, but also magnetizable material such as iron. The squirrel cage of the asynchronous machine can therefore be manufactured in part or in full by means of an additive printing method, such as "cold gas spraying". To this end, the conductor material (for example copper or aluminum) for the winding and a soft-magnetic material (for example FeSi2.9) for the teeth are printed layer by layer on a shaft, such that the conductors and the teeth are structured in parallel. Additionally, for example, in parallel between electrical conductor and intermediate body, i.e. in particular between the material of the conductor, tooth and/or shaft, a comparatively very thin layer (<=300 μm) of a third material, for example nickel, is printed and/or applied by vapor deposition, etc. This additional layer (also referred to as diffusion layer or contact layer in the following) is used to embody a diffusion zone. By way of this contact layer, an improved diffusion is produced, i.e. an improved diffusion zone, which increases or improves the bond between the adjacent materials. The tooth is one example of an intermediate body between the electrical conductors, which embody short-circuited windings. In a possible subsequent heat treatment (for example 6 hours at 400°), a diffusion zone in particular is then embodied between conductor material and diffusion layer, between diffusion layer and soft-magnetic material, as well as between diffusion layer and steel of the solid rotor, and thus a high-strength connection between the different materials.

If necessary, it may be necessary for process engineering and/or accuracy reasons to perform a subtractive intermediate processing between the additively constructed materials. The method or methods described are not exclusively limited to asynchronous machines with solid rotors. Rotors can also be embodied as partially solid, for example.

In one embodiment of the method, in one method step, a first electrical conductor and a second adjacent electrical conductor are printed, wherein the width thereof decreases, wherein in a following method step the intermediate body is printed between the first electrical conductor and the second electrical conductor, wherein the width thereof increases. This produces different thicknesses of the cross-section of the printed elements.

In one embodiment of the method, the electrical conductors and/or the intermediate bodies are printed onto a shaft body. In particular, this is constructed in such a solid manner that it is not influenced by centrifugal forces that occur.

In one embodiment of the method, there is an alternating change between a printing of at least some of one of the electrical conductors that are a first printed subject matter and the printing of at least some of the intermediate bodies that are a second printed subject matter, in such a manner that before a change a radial increase in thickness of the electrical conductor or the intermediate body is produced, which is between greater than or equal to 50% and less than or equal to 200% of the following radial increase in thickness of the other printed subject matter in each case. The radial increase in thickness can also be referred to as an increase in height. The height is produced from the difference between different radial distances of the printed material from the axis of rotation.

The method described contains a simplification of the manufacture and a considerable increase in the degree of automation (>80% possible) compared to the existing joining/HIP method. Moreover, it implies the possibility of realizing individual rotor geometries, adapted to specific requirements of the customer (rotor bar geometries), which cannot be manufactured with conventional methods, or can only be manufactured with extremely high outlay. Additionally, a rotor bar, i.e. an electrical conductor of the active part, can be given particular electrical material properties on a local basis, such as different electrical conductivities, for example.

In one embodiment of the method, the difference between a first height of the layers of the electrical conductors and a second height of the layers of the adjacent intermediate body does not exceed at most two layers during printing. In particular, the difference between adjacent layers is only one layer. This means that the difference in particular only has the height of one layer.

BRIEF DESCRIPTION OF THE DRAWING

The invention will now be shown and explained in greater detail by way of example, with reference to the figures. The features shown in the figures can also be combined to form new embodiments, without departing from the invention. Identical reference characters refer to similar elements, In the drawings:

FIG. 4 shows a first shape of printed electrical conductors;
FIG. 5 shows a second shape of printed electrical conductors.

DETAILED DESCRIPTION OF PREFERRED EMBODIMENTS

Figure 1:
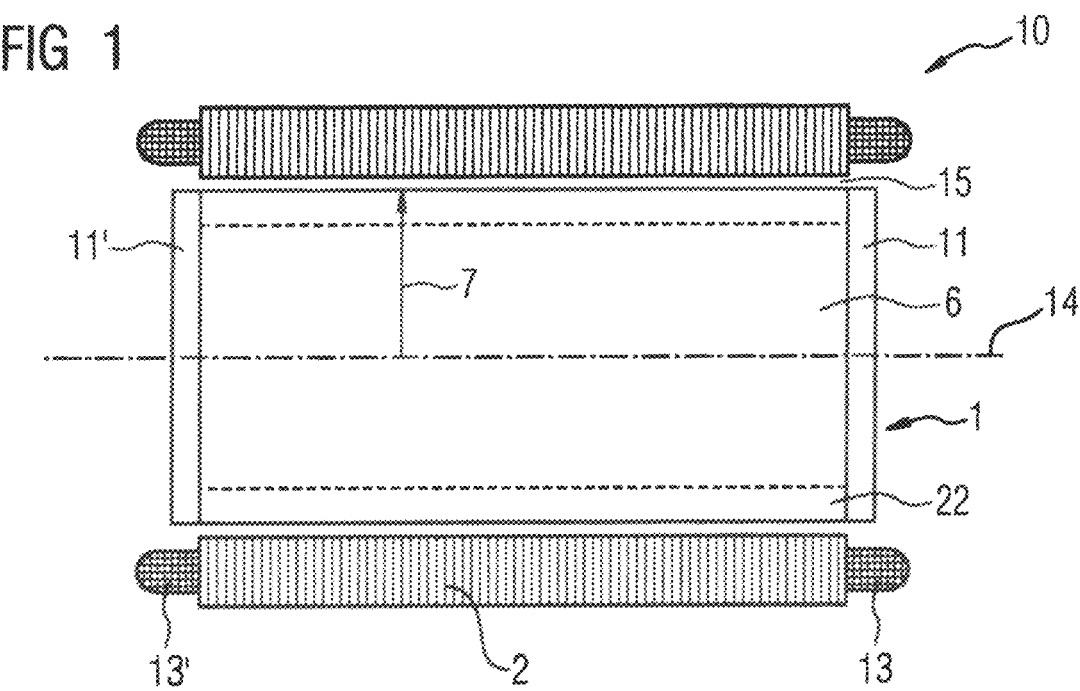
FIG. 1 shows an electric machine.

The representation according to FIG. 1 shows an electric machine 10, which has an active part 1 and a stator 2. In the present figure, the active part 1 is a rotor of the electric machine 10. In another representation, the rotor can be referred to as first active part and the stator as second active part. The stator 2 has windings with winding heads 13. The rotor, i.e. the active part 1 in the present example, is a cage rotor. An air gap 15 is located between the stator and the rotor. The active part 1 has a first short-circuit ring 11 and a second short-circuit ring 11'. The active part 1 is mounted such that it can rotate about an axis of rotation 14. The squirrel cage has electrical conductors that lie in a printed layer 22. The electrical conductors are printed onto a shaft body 6. The active part 1 has a radial extension with the radius 7. The printed layer 22 is located in a radially outer region of the active part 1. The electrical conductors of the squirrel cage are not explicitly shown in FIG. 1, but run in an axial direction approximately in parallel with the axis of rotation 14.

Figure 2:
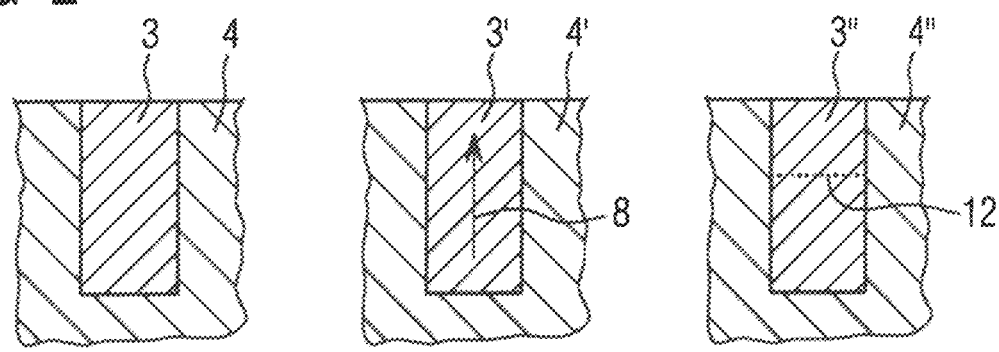
FIG. 2 shows slots.

The representation according to FIG. 2 shows various embodiments of electrical conductors 3,3',3" in slots. FIG. 2 shows an electrical conductor 3, with a constant copper alloy. This is suitable for starting up the electric machine without particular requirements. FIG. 2 also shows an electrical conductor 3', in which it is indicated by an arrow 8 that the conductivity reduces radially outward. This can be achieved, for example, by an alloy with CuSi. Higher conductivities can be achieved by an E-Cu alloy, for example. By changing the conductivity, it is possible to respond to increased requirements in relation to the startup of the electric machine. The transition of the alloy does not necessarily have to be steady. It is also possible, for example, for the conductivity to change suddenly, as symbolized in the electrical conductor 3" by the dotted line 12.

Figure 3:
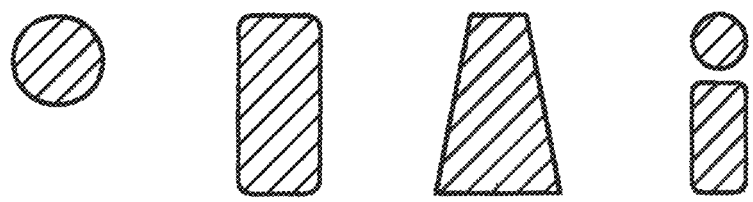
FIG. 3 shows slot shapes.
Figure 6:
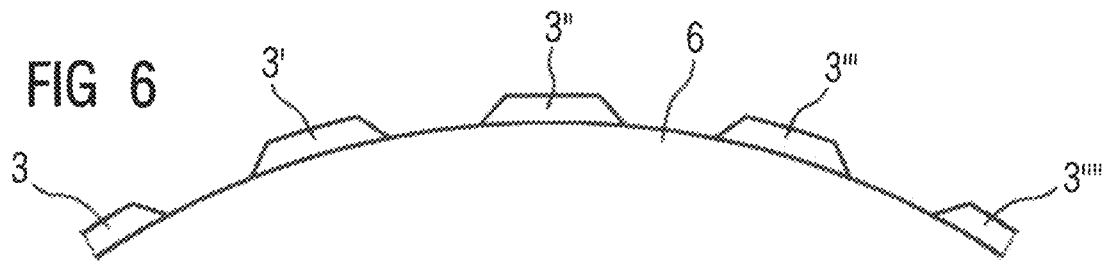
FIG. 6 to FIG. 9 show a first sequence of a printing procedure.
Figure 7:
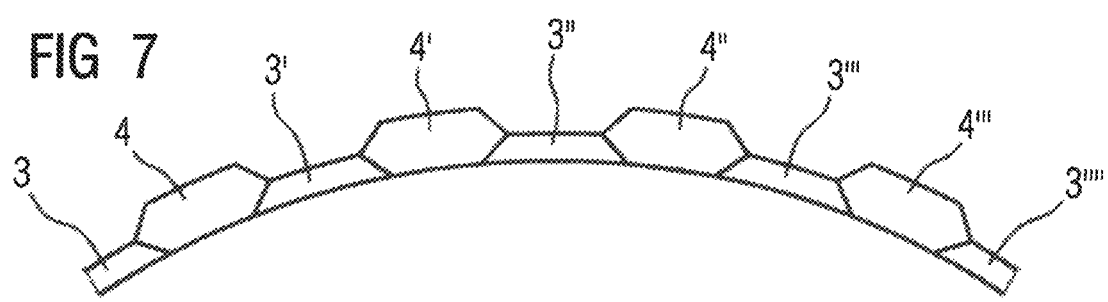
Figure 8:
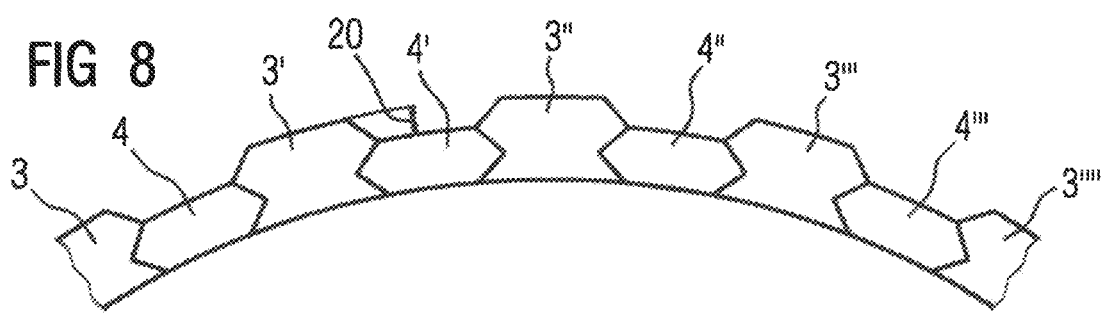

The representation according to FIG. 3 shows various cross-sectional shapes of electrical conductors. In FIG. 2, a rectangular cross-section is chosen. In FIG. 3, the following cross-sections are shown from left to right: round bar cross-section, tall bar cross-section, wedge bar cross-section and twin bar cross-section with startup- and operating cage. Using the cold spraying method, it is possible to realize different standard bar shapes with locally different electrical conductivity.

The representation according to FIG. 4 shows the positioning of the electrical conductors and intermediate pieces in a wedge-like cutout of the active part, in an end face-side cross-section. The intermediate bodies 4,4',4",4''' are located between the electrical conductors 3,3',3",3'''. The electrical conductors have layers, wherein only the layers 19 and 19' are shown by way of example for the electrical conductors 3' in FIG. 4, in order to not impair the clarity. The intermediate bodies also have layers, wherein the layers 19, 19' and 19" are only shown for the intermediate body 3' in FIG. 4, in order to not impair the clarity. Electrical conductors have a radial thickness, as do intermediate bodies. This radial thickness can also be referred to as height. FIG. 4 shows by way of example the height 23 for the electrical conductors 3" and the height 24 for the intermediate bodies 4".

In particular, the electrical conductors feature copper. In particular, the intermediate bodies feature iron and/or steel. Both are printed. Located between the electrical conductors and the intermediate bodies are contact layers 5,5',5",5''', which in particular feature nickel. The contact layers have a jagged pattern 16,16'. The electrical conductors and the intermediate bodies are printed on a shaft body. Printing takes place from the inside out, which is illustrated by the radial direction 17. The width 9,9',9",9''' of the electrical conductors alternates outward in the circumferential direction. The width of the intermediate bodies at the same radial position also changes in an alternating manner relative thereto. The jagged shape produces a particularly effective stabilization within a printed layer 22.

The representation according to FIG. 5, in a similar manner to FIG. 4, shows the cross-section of a cutout of an active part, wherein the border region between the electrical conductors and the intermediate bodies is not shown, but runs in an undulating manner.

Figure 9:
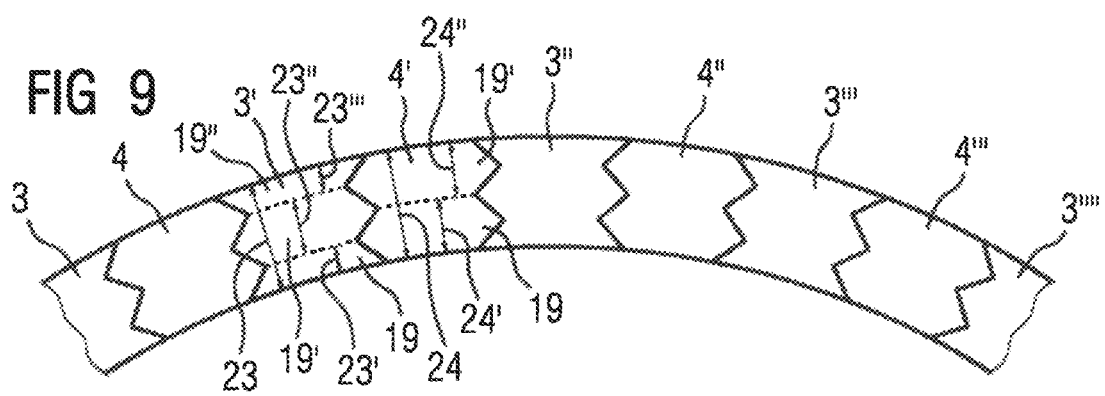
Figure 10:
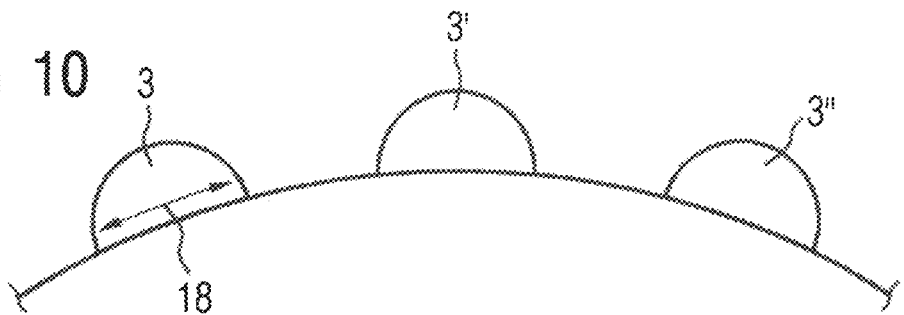
FIG. 10 to FIG. 13 show a second sequence of a printing procedure.
Figure 11:
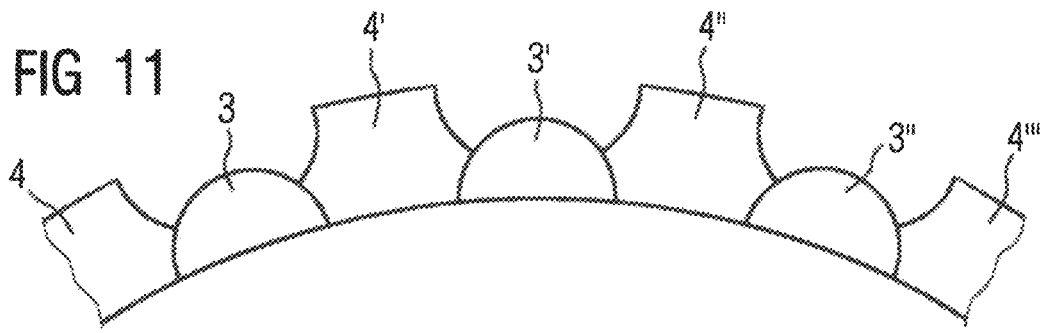
Figure 12:
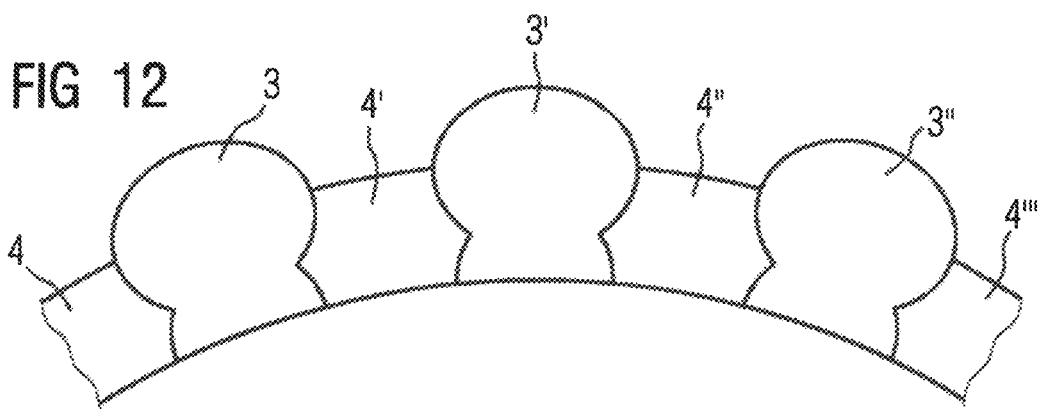
Figure 13:
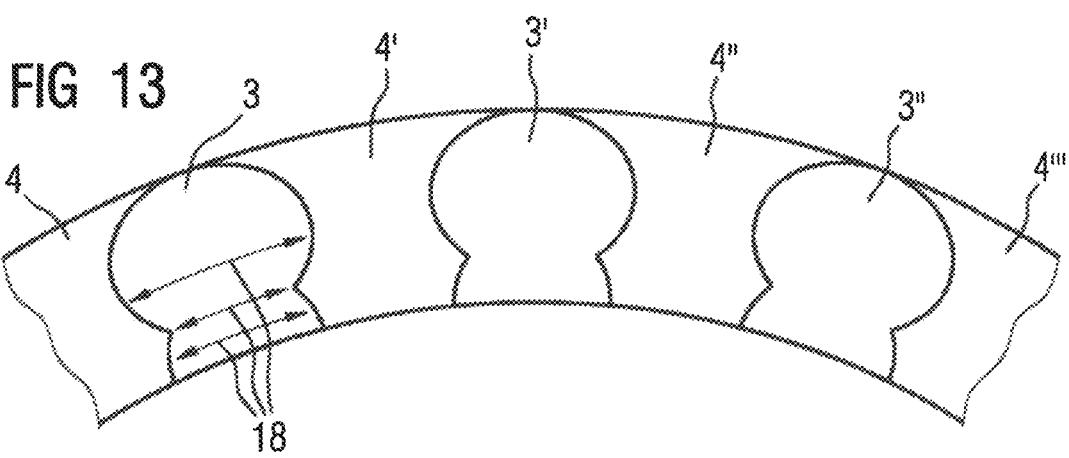

The representation according to FIGS. 6 to 9 shows the sequence of printing procedures. In a first step, a layer of the electrical conductors 3,3',3",3''' is printed onto the shaft body 6. These electrical conductors are at a distance from one another. In a subsequent step, layers of the intermediate bodies 4,4',4",4''' are printed, wherein these are produced radially outward over the first layer of the electrical conductors. According to FIG. 8, in a further step, the electrical conductors are then printed again layer by layer, meaning that these also protrude radially outward over the intermediate bodies. This produces steps 20. In further steps, which are shown in FIG. 9, first the intermediate bodies are printed radially outward, before the electrical conductors are then subsequently printed outward in such a manner that the steps are no longer present. By way of this stepped approach, layers 19, 19' are formed. The layers 19, 19' and 19" also have radial thicknesses, i.e. heights. By way of example, the heights 23', 23" and 23''' and 24' and 24" for the corresponding layers are accordingly drawn in FIG. 9.

The representation according to FIGS. 10 to 13 shows the sequence of printing procedures corresponding to the sequence already shown in FIGS. 6 to 9. By contrast, the electrical conductors have a round shape and this conveys how electrical conductors and intermediate bodies can be connected to one another due to their shape, in order to absorb centrifugal forces. In this context, it is shown that here too the width 18 of an embodied electrical conductor changes in an alternating manner radially outward, i.e. one time becomes larger, and then smaller again, and larger, or vice versa.

The invention claimed is:

1. An active part of an electric machine, said active part comprising:
   electrical conductors which are additively printed in layers;
   intermediate bodies respectively disposed between the electrical conductors and being additively printed in layers, wherein the electrical conductors are printed in a radially increasing manner, alternating with the intermediate bodies; and
   a contact layer <=300 μm of a material different from a material of the electrical conductors and intermediate bodies, said contact layer being applied between at least one of the electrical conductors and at least one of the intermediate bodies, with a diffusion zone being embodied by the contact layer and a heat treatment.

2. The active part of claim 1, wherein at least one of the electrical conductors has a section with a cross-section which tapers as a height of the at least one of the electric conductors increases.

3. The active part of claim 1, wherein at least one of the electrical conductors has a plurality of sections with cross-sections that taper as a height of the at least one of the electric conductors increases.

4. The active part of claim 1, further comprising a three-dimensional structure embodied between at least one of the electrical conductors and at least one of the intermediate bodies.

5. The active part of claim 4, wherein the three-dimensional structure has a jagged pattern or an undulating pattern in a cross-section.

6. The active part of claim 1, wherein the electrical conductors have an electrical conductivity which differs as a function of a radial height of the electrical conductors.

7. The active part of claim 1, wherein the contact layer includes nickel.

8. A method for producing an active part of an electric machine, said method comprising:
   additively printing electrical conductors layer by layer;
   printing intermediate bodies layer by layer between electrical conductors such that there is an alternating change between the printing of at least one electrical conductor and an intermediate body,
   wherein the electrical conductors are printed in a radially increasing manner, alternating with the intermediate bodies,
   wherein a difference between a first height of the layers of the electrical conductors and a second height of the layers of an adjacent one of the intermediate bodies does not exceed at most two layers during printing; and
   applying a contact layer <=300 μm of a material different from a material of the electrical conductors and intermediate bodies between at least one of the electrical conductors and at least one of the intermediate bodies, with a diffusion zone being embodied by the contact layer and a heat treatment.

9. The method of claim 8 wherein the difference between the first height of the layers of the electrical conductors and the second height of the layers of the adjacent one of the intermediate bodies does not exceed one layer.

10. The method of claim 8 wherein a first one of the electrical conductors and a second adjacent one of the electrical conductors are initially printed with a decreasing width, and subsequently a corresponding one of the intermediate bodies is printed between the first electrical conductor and the second electrical conductor with an increasing width.

11. The method of claim 8, wherein the electrical conductors and/or the intermediate bodies are printed onto a shaft body.

12. The method of claim 8, wherein there is an alternating change between a printing of at least part of one of the electrical conductors that are a first printed subject matter and the printing of at least part of the intermediate bodies that are a second printed subject matter, in such a manner that before a change an increase in radial height of the electrical conductor or the intermediate body is produced, which is between greater than or equal to 50% and less than or equal to 200% of a following increase in height of a respectively other one of the printed subject matters.

13. The method of claim 8, further comprising heat treating the active part.

14. The method of claim 8, for producing an active part comprising electrical conductors which are additively printed in layers, intermediate bodies respectively disposed between the electrical conductors and being additively printed in layers, wherein the electrical conductors are printed in a radially increasing manner, alternating with the intermediate bodies, and a contact layer <=300 µm of a material different from a material of the electrical conductors and intermediate bodies, with the contact layer being applied between at least one of the electrical conductors and at least one of the printed intermediate bodies, with a diffusion zone being embodied by the contact layer and a heat treatment.

15. The method of claim 14, wherein at least one of the electrical conductors has a section with a cross-section which tapers as a height of the at least one of the electric conductors increases.

16. The method of claim 14, wherein at least one of the electrical conductors has a plurality of sections with cross-sections that taper as a height of the at least one of the electric conductors increases.

17. The method of claim 14, further comprising forming a three-dimensional structure between at least one of the electrical conductors and at least one of the intermediate bodies.

18. The method of claim 17, wherein the three-dimensional structure has a jagged pattern or an undulating pattern in a cross-section.

19. The method of claim 14, wherein the electrical conductors have an electrical conductivity which differs as a function of a radial height of the electrical conductors.

20. The method of claim 14, wherein the contact layer includes nickel.

* * * * *